July 7, 1931.  W. F. C. BOUCHSPIES  1,813,559
THREE-DIMENSIONAL PROJECTION
Filed Sept. 21, 1926
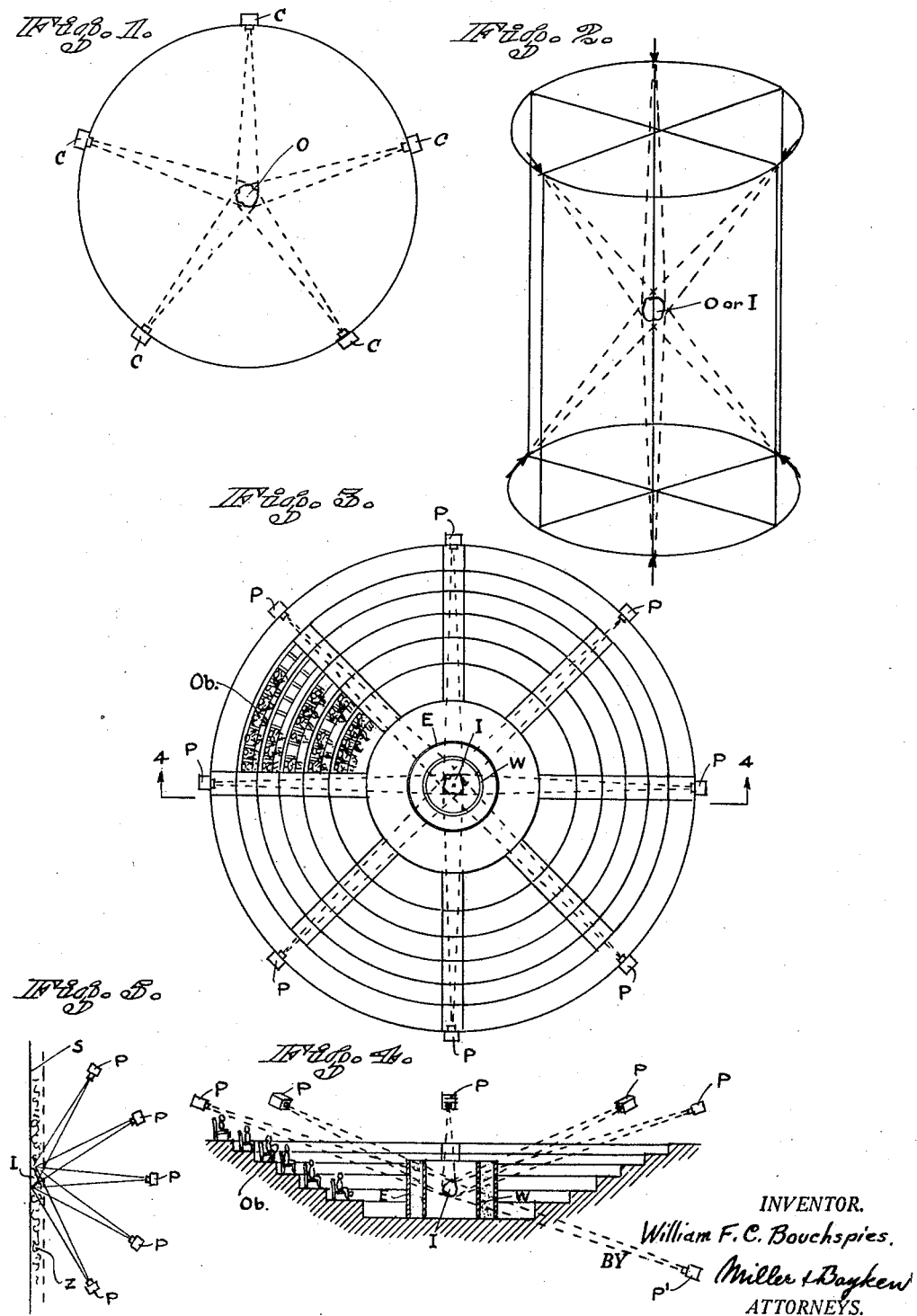
INVENTOR.
William F. C. Bouchspies.
BY Miller & Boyken
ATTORNEYS.

Patented July 7, 1931

1,813,559

UNITED STATES PATENT OFFICE

WILLIAM F. C. BOUCHSPIES, OF SAN FRANCISCO, CALIFORNIA

THREE DIMENSIONAL PROJECTION

Application filed September 21, 1926. Serial No. 136,822.

This invention relates to optical projection for giving relief effects instead of the usual flat effects obtained on a picture screen, and the objects of the invention are not only to produce relief effects but to provide means whereby the projected image shall be formed actually in three dimensions in space either as a replica of the original object or of larger or smaller size than the original and so that the image may be viewed as a solid from all sides, as by the observer walking around the image—also means by which three dimensional images of proposed structures may be projected to proposed points of erection of the structures, such as contemplated buildings on proposed sites etc.

Briefly described, my method when effected through the aid of photography comprises the photographing of a screen or given object from a plurality of definite angular points of view all around the object so that the views will overlap one another, and of projecting the finished views back again toward a common center from similar angularly situated points and intercepting the images of the several projectors in a fluid light reflecting medium such as smoke, fog, natural or artificial, dust, mist or liquid body containing suspended light reflecting particles or emulsions of sufficient density to receive the various projected images and thereby build up through their overlapping a compound projected image in three dimensions, thus reproducing the original in apparently solid form so that it may be observed from all sides.

The quality of the reproduction will depend upon several factors such as the number of views taken to gain a complete overlapping of the same, the accuracy of reprojection and the nature or density of the image receiving medium.

In the drawings hereto several diagrams are shown to illustrate the invention and of which Figure 1 is a plan view of an object being photographed from 5 positions to illustrate the overlapping of the views in plan, Figure 2 is an isometric figure showing the object being photographed from three upper and three lower positions showing every part of the image as exposed to rays from more than one instrument, Figure 3 is a plan of a circular theater arranged around a circular center stage over which the three dimensional image is recreated from a battery of projectors surrounding the stage, Figure 4 is a central sectional elevation of the theater as taken along the lines 4—4, and Figure 5 is a plan showing a compound vapor or dust and flat screen with a battery of projectors arranged to project a semi-solid image thereon.

To get good results it is essential that the several images taken of the original object O should each overlap adjacent images, and while this may be approximated with three views in some instances, the use of five cameras C as shown in Figure 1 insures in plan a complete overlapping sufficient for the normal observer as in a theater, when the image is reconstructed from such views by projection from similar points or angular dispositions of the projecting instruments.

However, where it is desired to reproduce an appearance of complete solidity as for a sphere which may be observed at all sides as well as top and bottom it is necessary that the instruments should be disposed both above and below the object O and image I, and under such conditions the minimum number of views to obtain overlapping would appear to be six as indicated by the diagram of Figure 2 wherein three points above and three below the object or image O or I are indicated by the arrows.

Where but a bas-relief effect only is desired a plurality of views taken of the object from the forward sides only may be projected back at similar angles from projectors P to a sheet screen S in front of which is created a zone of smoke, dust or fog as indicated at Z.

It is also contemplated that a zone of clear air be arranged between the smoke or vapor screen and which in the complete form of the invention shown in Figures 3 and 4 takes the form of a circular glass enclosure E spaced from an inner glass wall W which latter contains within it the three dimensional image receptive material, which as stated may be gaseous, dust or liquid.

In this projecting arrangement the instruments P are arranged above and entirely around the image I and directed downwardly at an angle just over the observers' heads Ob, also preferably arranged angularly, while if desired an additional set of instruments P' may be arranged to project their respective views; corresponding to views taken from those angles; in an upward direction, and in which case the observers may just as well be arranged along a central plane between the upper and lower projectors as the image would be complete when viewed from such a plane.

It is of course to be understood that in the complete circular projecting arrangement for three dimensional images or views as shown in Figures 3 and 4 that the cells E and W may be dispensed with and a zone of receptive area created directly in the air by any suitable means.

Also, images of the planets may be projected and recreated as it were in the very air over the observers' heads by proper preparation of the air at the desired zone, so that the planet will hang in the air like an actual thing.

Also to be noted is the fact that the projected images may be from hand made drawings of carefully figured out subjects adapted to unite upon simultaneous projection into a suitable medium, or the system may be applied to subjects in motion so as to effect motion "pictures" in three dimensions, and in which case the various elements of the "picture" will move among one another in all directions.

In the case of views of proposed buildings or bridges, these may be projected at the proposed sites at night into natural fog under suitable conditions or into artificially made fog, smoke, dust or mist, and any of such variations of the invention as may come within the scope thereof are intended to be covered in the appended claims.

I claim:

1. A system of optical projection of images which comprises, taking a plurality of pictures of a given object from various angles about said object and projecting said pictures of said object by means of visible light rays at respectively similar angles, toward a common center, a fluid light reflecting medium located substantially at said common center adapted to reflect the compound image resulting therefrom.

2. A system of projection as specified in claim 1 wherein said various angles are taken from a plurality of positions above and below the object and image.

3. A system of projection as specified in claim 1 wherein said various angles are taken from a plurality of positions entirely around the object and image.

4. A system of projection as specified in claim 1 wherein said various angles are taken from a plurality of positions entirely around the object and image both above and below the same.

5. A system of projection as specified in claim 1 wherein a clear fluid zone is provided adjacent said medium and through which the images are projected.

6. A system of projection as specified in claim 1 wherein a transparent wall encloses a zone of clear gas adjacent said medium.

7. The method of optical representation of images in three dimensions which comprises projecting views of all sides of an object in overlapping relation into a three dimensional light-reflecting fluid medium adapted for forming a compound image therein.

WILLIAM F. C. BOUCHSPIES.